United States Patent
Sångberg

(10) Patent No.: US 9,242,174 B2
(45) Date of Patent: Jan. 26, 2016

(54) SYSTEM AND METHOD FOR DYNAMICALLY DISTRIBUTING GAME DATA

(75) Inventor: Troed Nils Rickard Sångberg, Malmö (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 2577 days.

(21) Appl. No.: 11/934,839

(22) Filed: Nov. 5, 2007

(65) Prior Publication Data

US 2009/0098940 A1     Apr. 16, 2009

Related U.S. Application Data

(60) Provisional application No. 60/979,896, filed on Oct. 15, 2007.

(51) Int. Cl.
  *A63F 13/12*   (2006.01)
  *A63F 13/30*   (2014.01)
  *H04L 29/06*   (2006.01)

(52) U.S. Cl.
  CPC .......... *A63F 13/12* (2013.01); *H04L 67/38* (2013.01); *A63F 2300/406* (2013.01); *A63F 2300/534* (2013.01); *A63F 2300/556* (2013.01); *A63F 2300/5533* (2013.01); *A63F 2300/5573* (2013.01)

(58) Field of Classification Search
  USPC .......................................... 463/16, 20, 40, 42
  See application file for complete search history.

(56) References Cited

U.S. PATENT DOCUMENTS

| | | | |
|---|---|---|---|
| 2004/0106449 A1* | 6/2004 | Walker et al. .................... | 463/25 |
| 2004/0127289 A1* | 7/2004 | Davis et al. ...................... | 463/42 |
| 2004/0143852 A1 | 7/2004 | Meyers | |
| 2004/0219961 A1* | 11/2004 | Ellenby et al. ..................... | 463/1 |
| 2005/0064926 A1* | 3/2005 | Walker et al. .................... | 463/16 |
| 2006/0068917 A1* | 3/2006 | Snoddy et al. ................... | 463/42 |
| 2007/0207860 A1* | 9/2007 | Yamauchi et al. ............... | 463/42 |
| 2007/0239826 A1 | 10/2007 | Ducheneaut et al. | |

OTHER PUBLICATIONS

International Search Report mailed Apr. 8, 2009 for International Application No. PCT/EP2008/062848 filed Sep. 25, 2008.

* cited by examiner

*Primary Examiner* — Paul A D'Agostino
*Assistant Examiner* — Brandon Gray
(74) *Attorney, Agent, or Firm* — Coats & Bennett, PLLC

(57) ABSTRACT

A gaming device having a controller allows a user of the device to play a multiplayer on-line game as a member of a team. The controller identifies the team members, and generates strategic data for distribution to the team members. The strategic data may be tactical data used by the team to achieve a predetermined objective of the on-line game. The controller also detects the occurrence of a predetermined event. Whenever a predetermined event occurs, the controller distributes the strategic data to one or more of the other team members.

24 Claims, 6 Drawing Sheets

SYSTEM AND METHOD FOR DYNAMICALLY DISTRIBUTING GAME DATA

RELATED APPLICATIONS

This application claims priority from U.S. Application Ser. No. 60/979,896 entitled "A System and Method for Dynamically Distributing Game Data." That application was filed as a provisional application on Oct. 15, 2007, and is incorporated herein by reference in its entirety.

FIELD OF THE INVENTION

The present invention relates generally to on-line gaming, and particularly to distributing the data and information generated while playing on-line games between players.

BACKGROUND

Multi-player on-line games are becoming increasingly popular with the public. One such type of game is called an on-line role-playing game (RPG). Generally, a player in an RPG will assume the role of a fictional character called an avatar that lives in an imaginary world. During the game, the player controls the avatar to fight battles, search for treasure or weapons, or gain knowledge or experience. These actions or "quests" are usually governed by a system of formal rules and guidelines; however, players are typically free to improvise their actions within the rules. As a player successfully completes a quest, the player may be rewarded with points and is also permitted to progress through increasingly higher levels of the game.

One especially popular type of RPG is called a massively multi-player on-line role-playing game (MMORPG). MMORPGs, such as WORLD OF WARCRAFT, SECOND LIFE, and FINAL FANTASY, utilize the Internet to enable thousands of players to assume their own avatar in a constantly evolving virtual world. MMORPGs differ from other RPGs in several respects. For example, with some MMORPGs, the imaginary world in which the avatar exists is "persistent." That is, the world continues to evolve regardless of whether anyone is logged in and actively playing the game. Additionally, while players may progress through the world as independent entities, MMORPGs usually require the players to form teams and cooperate to successfully complete quests or other actions.

Role-playing games, however, are not the only types of on-line games enjoying an increase in popularity. Other on-line games, such as WORLD IN CONFLICT, COUNTER STRIKE TEAM FORTRESS, and any of a variety of sports-related games are also popular with users. Such games offer players a chance to "own" or "manage" a sports team, join forces with other players to accomplish predetermined tasks, and/or to match their skills against other players to defeat other players and teams.

Although most players engage in on-line gaming activities from their own desktop or laptop computers, or from specialized gaming consoles such as the XBOX or the PLAYSTATION, the widespread availability of mobile communication devices, such as cellular telephones, personal digital assistants, and laptop computers, has lead to an increasing demand to place on-line gaming applications on mobile devices. Playing multiplayer on-line games on mobile devices, however, introduces issues that are not present when playing games on desktop computers. For example, the user interfaces on most mobile devices have limited capabilities. This makes the task of inputting large amounts of data tedious. In addition, players using mobile devices move from location to location, and thus, typically join and leave a game more often than they would if they were seated at a desktop computer.

Players on a team can benefit from data and information gathered by other team members while playing the multiplayer on-line game. By way of example, most MMORPGs require team members to communicate with each other so that each will know the other's skills, abilities, and strategies for completing a quest. This permits team members to continue a quest in the absence of other team members. The limited abilities of mobile devices make sharing such information difficult.

SUMMARY

The present invention facilitates the sharing of game-related data between team members engaged in playing a multiplayer on-line game. In one embodiment, the present invention identifies one or more members of a team cooperating with each other to achieve a predetermined objective of the on-line game. To assist the team members in achieving the objective, the present invention collects game-related data and uses it to generate strategic data. The strategic data may include information such as tactical information that the team members may need to achieve the objective. The present invention then distributes the strategic data to selected team members responsive to detecting an occurrence of a predetermined event.

In one embodiment, a user has a mobile device, such as a cellular telephone, that is configured to connect to a game host. The game host may be, for example, a network game server or a client device that functions as a game server. The user is part of a team that cooperates to play the game, and to complete a game-related goal or quest successfully. Periodically, the mobile device uploads its game-related data to the game host, as do the client devices of the other team members. The game host stores this data and uses it to generate the strategic data. Whenever the server detects that a predetermined event has occurred, it retrieves the strategic data from memory and distributes it to one or more selected players. The predetermined event may be, for example, whenever a person joins or leaves the game, moves to a predefined geographical area, or whenever a person completes a predefined action.

DETAILED DESCRIPTION

The present invention provides a system and method for distributing game-related data and information between the members of a team that is engaged in playing an on-line game. Particularly, the players cooperate as a team to achieve a common goal or quest in the multiplayer on-line game. Each team member may have his or her own set of skills and information to help them achieve the goal. The skills and information may differ between each team member, and may comprise data that could assist the other team members achieve the common goal.

In one embodiment, a user is part of a team engaged in playing an on-line game. The user may employ his mobile communication device to play the game. Periodically the mobile device and the devices of the other team members send their game-related data to a central server. The central server assembles this information, and uses it to generate strategic data for storage in memory. Whenever a predetermined event occurs, the server distributes the assembled data to selected remote parties. This ensures that each team member has access to the skills and information of each of the other team members. With some games, it may allow some team members to continue playing the game even if not all team members are actively playing the game.

Figure 1:
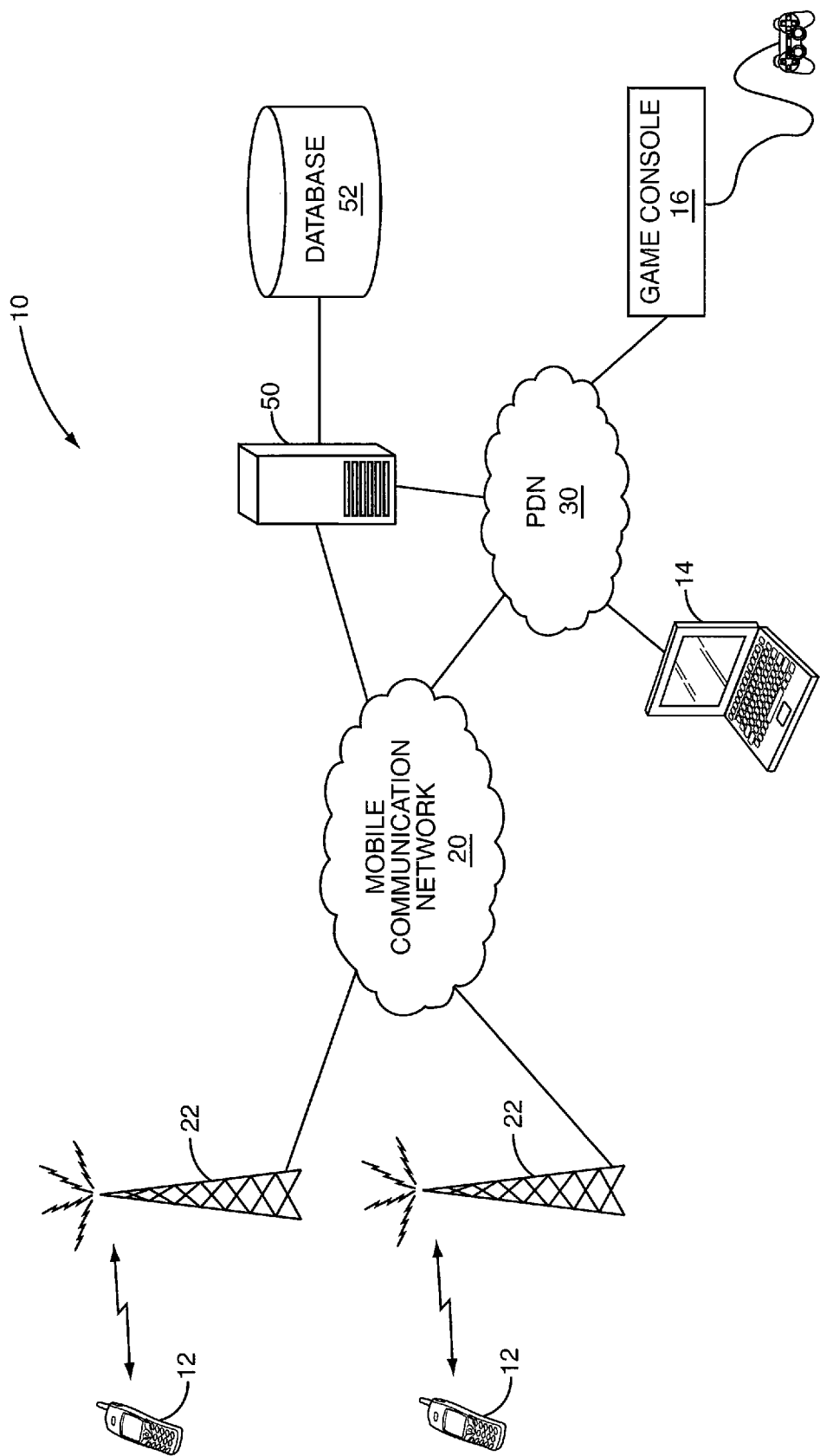
FIG. 1 illustrates a wireless communication network suitable for one embodiment of the present invention.

FIG. 1 illustrates a data communication network 10 that is suitable for use with one embodiment of the present invention. Data communications network 10 provides networking capabilities for a plurality of mobile devices 12, which may comprise cellular telephones, personal digital assistants, laptop computers, or personal game devices. The data communications network 10 enables suitably-equipped mobile device users to participate in multiplayer games. For clarity, the following embodiments are discussed in the context of the multiplayer game being a massively multiplayer on-line role-playing game (MMORPG). It should be appreciated, however, that the present invention is not limited to any specific type of data communications network or access technology, nor is it limited to use with any specific MMORPG, or with any specific type of on-line game.

The data communication network 10 comprises a mobile communication network 20 having one or more base stations or wireless access points 22 for communicating with mobile devices 12. The mobile communication network 20 provides packet data services to mobile devices 12 as is known in the art and may operate according to any conventional standard, such as GSM, WCDMA, WiFi, WiMAX, and LTE standards.

Mobile communication network 20 connects to a Packet Data Network (PDN) 30. PDN 30 comprises a packet-switched network that implements conventional protocols, such as the suite of Internet protocols. The PDN 30 may comprise a public or private network, and may be a wide area or local area network. The Internet is one well-known example of a PDN 30. Both mobile computing devices 14 and fixed computing devices 16, such as an XBOX or a PLAY-STATION gaming console, may connect to the PDN 30.

A host server 50 connects to the mobile communication network 20 and/or PDN 30, and is accessible to the mobile devices 12 via the mobile communication network 20, and the computing devices 14, 16 via PDN 30. The host server 50, which may function as a game server, provides on-line gaming services to the devices 12, 14, 16. In one embodiment, the devices 12, 14, 16 may have a game client installed for interacting with the host server 50. In other embodiments, the host server 50 may push game applications to the mobile devices 12 and or devices 14, 16 to enable players to play multiplayer on-line games.

The server 50 enables players to engage in a multiplayer game without the need to remain connected to the network for the duration of the game session. The multiplayer game may be, for example, a MMORPG. Generally, the host server 50 stores various game scenarios or stages in a database (DB) 52. In one embodiment, the scenarios are stored as state information that defines where the user may begin (or resume) game play. Whenever a player logs into host server 50 to play the on-line game, the host server 50 retrieves the appropriate scenarios and sends them to the user.

Typically, each member of a team engaged in playing a MMORPG assumes the role of a fictional character called an "avatar" living in an imaginary world. During the game, each team member controls his or her avatar to fight battles, search for treasure or weapons, or gain knowledge or experience. As play continues, the avatar may gain or lose different characteristics such as skills, tools, knowledge, attributes, weapons, and experience. In one embodiment, the host server 50 quantizes these characteristics and other game-related information for storage in DB 52. The user may employ these characteristics and game-related information in various attempts to complete quests, win battles, or perform other game-related actions successfully. If the user is a member of a team, one or more of the other team members may leverage these characteristics to attempt to achieve success for the team.

For example, the fictional world in which the players play the on-line game may persist such that some team members may continue to play the game in the absence of other team members. This requires that each team member share the quantized characteristics of his or her avatar and other game-related information with the other team members. This permits those actively playing the on-line game to rely on the skills, knowledge, tools, experience, and weapons, for example, of the other team members even when they are not on-line and actively playing the game. However, characteristics and other game-related data changes and therefore, should be distributed to all team members. Fixed devices, such as computing device 14, for example, have an interface that allows a player to provide other team members with updated characteristics during the game upon request. This may not be possible, or as easy to do, with some client devices such as mobile device 12, or game console 16.

For example, each time a player logs into a game, they may generate a request to obtain the updated characteristics and game-related information from each of the other players. Mobile device 12 has limited memory resources, and further, may include an interface that makes responding to such requests from other team members tedious. Game console 16 may, in some cases, experience similar limitations with respect to their user interfaces. Thus, the amount and complexity of the user's game-related data, and those of the other team members, should be kept small and manageable. Further, because they are portable, mobile devices 12 tend to log into and out of a game more often than would their fixed device 14, 16 counterparts. As such, mobile device 12 user may receive multiple requests for the same information.

The present invention provides a method that stores a player's characteristics, such as the quantized characteristics of a player's avatar, as well as other game-related information at a central server. Periodically, the server then distributes this information as needed to other players whenever a predetermined event occurs. Distribution may occur on a one-to-one basis between individual team members, on a one-to-many basis between one team member and the rest of the team, or on a many-to-many basis between all team members.

Figure 2:
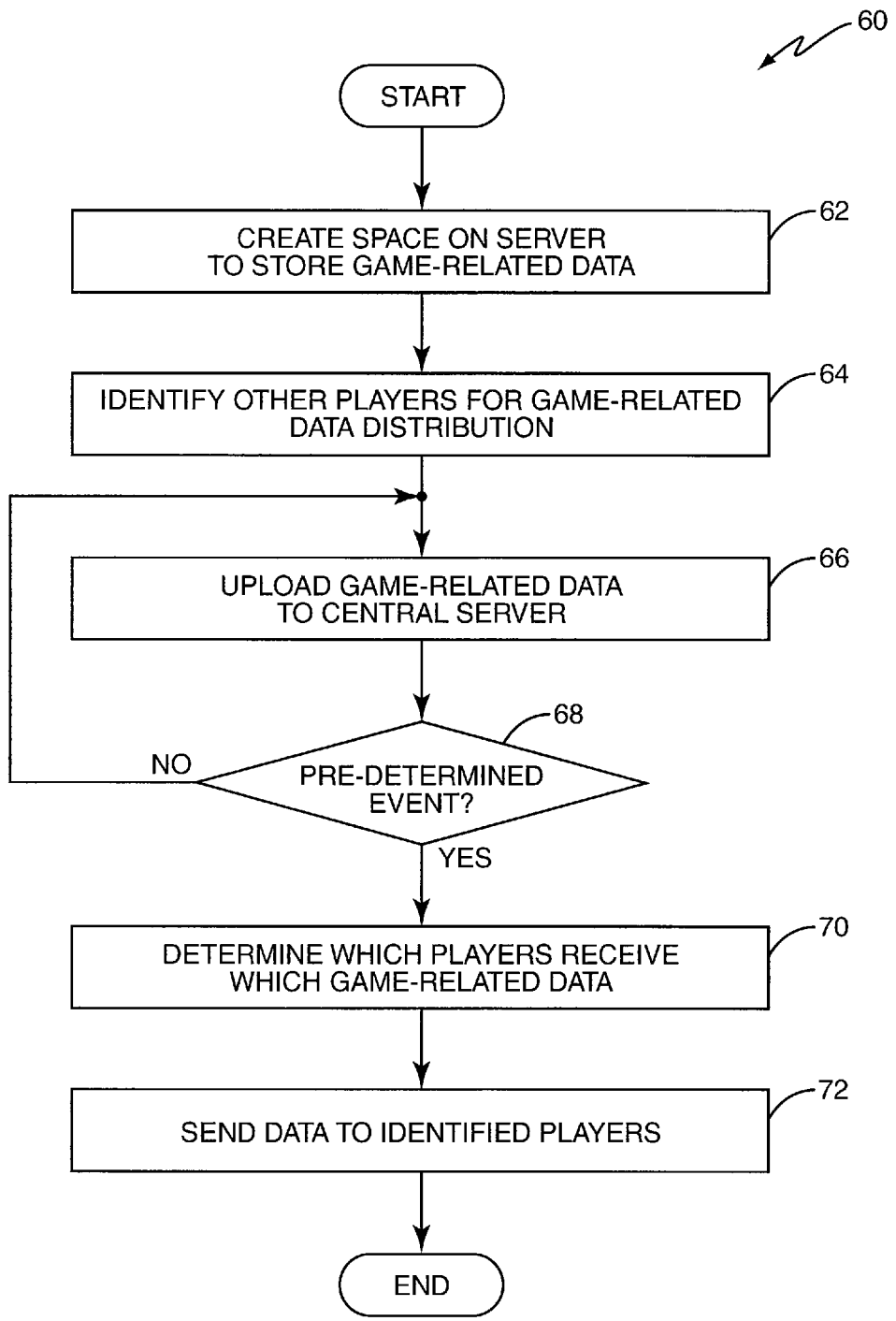
FIG. 2 is a flow chart illustrating a method of distributing game-related data according to one embodiment of the present invention.

FIG. 2 illustrates one method 60 for distributing game-related data, such as the quantized characteristics of a player's avatar, according to one embodiment of the invention. To simplify the description, FIG. 2 assumes that there are at least two game players, and that both are on the same team. However, those skilled in the art will appreciate that the principals may be easily extended to as many players as is needed or desired. Further, there is no requirement that the players be on the same team.

The host server 50 may allow each player to create and customize an area of memory referred to herein as a page. The player's page would contain game-related data that is unique to the particular player. Before beginning a gaming session, a player may log into the host server 50 to create or define a page to store game-related data (box 62). The game-related data may be, for example, the quantized characteristics defining the skills, knowledge, experience, tools, and weapons of the player's avatar. The data could also include tactical information that the player may use to achieve a goal or quest common to the team. The host server 50 may also allow players to identify other players to receive the game-related data, and one or more predetermined events that may occur during the game (box 64). As described in more detail below, the predetermined events are triggers that will cause the host server 50 to distribute the player's game-related data to other selected players.

As a player progresses through a game, the mobile device 12 may upload updated game-related data and information to the host server 50. The host server 50 may also keep this information up-to-date (box 66). During the course of the game, the host server 50 will monitor for the occurrence of certain predetermined events. While the host server 50 does not detect a predetermined event (box 68), the player's game-related data may be updated. However, when the host server 50 detects that a predetermined event has occurred (box 68), the host server 50 triggers a function to distribute the game-related data. Particularly, the host server 50 retrieves the player's game-related data page to determine which of the other players, if any, are to receive the game-related data (box 70). The host server 50 then assembles the player's game-related data to generate the strategic data, and distributes the data to the identified players (box 72).

As stated previously, the data distributed to the members of the team can comprise player-specific data (e.g., a player's skills, tools, characteristics, etc). However, the data may include other information as well. By way of example, new players may join a given game dynamically. The host server 50 could detect this event as a predetermined event, and send the new player the saved data and information. The new players may receive messages and/or information such as "Healer's needed," or "There are already too many warriors" when they attempt to join the game. Such data would let a dynamically joining player know whether their specific skill is or is not needed.

In other embodiments, the data may include information that defines tactical information. Such information includes, but is not limited to, a strategic goal for a team or player, the identities of any teams and/or other players that may or may not be cooperating with your team to achieve the defined strategic goal, what, if any, weapons are needed or desired, which specific skills, tools, or characteristics are needed for the team to achieve the stated goal, whether other teams or players wish to trade items with you and which items they offer, and a preferred method of attacking an enemy to achieve the stated goal. Other information may also be distributed to the players.

Figure 3:
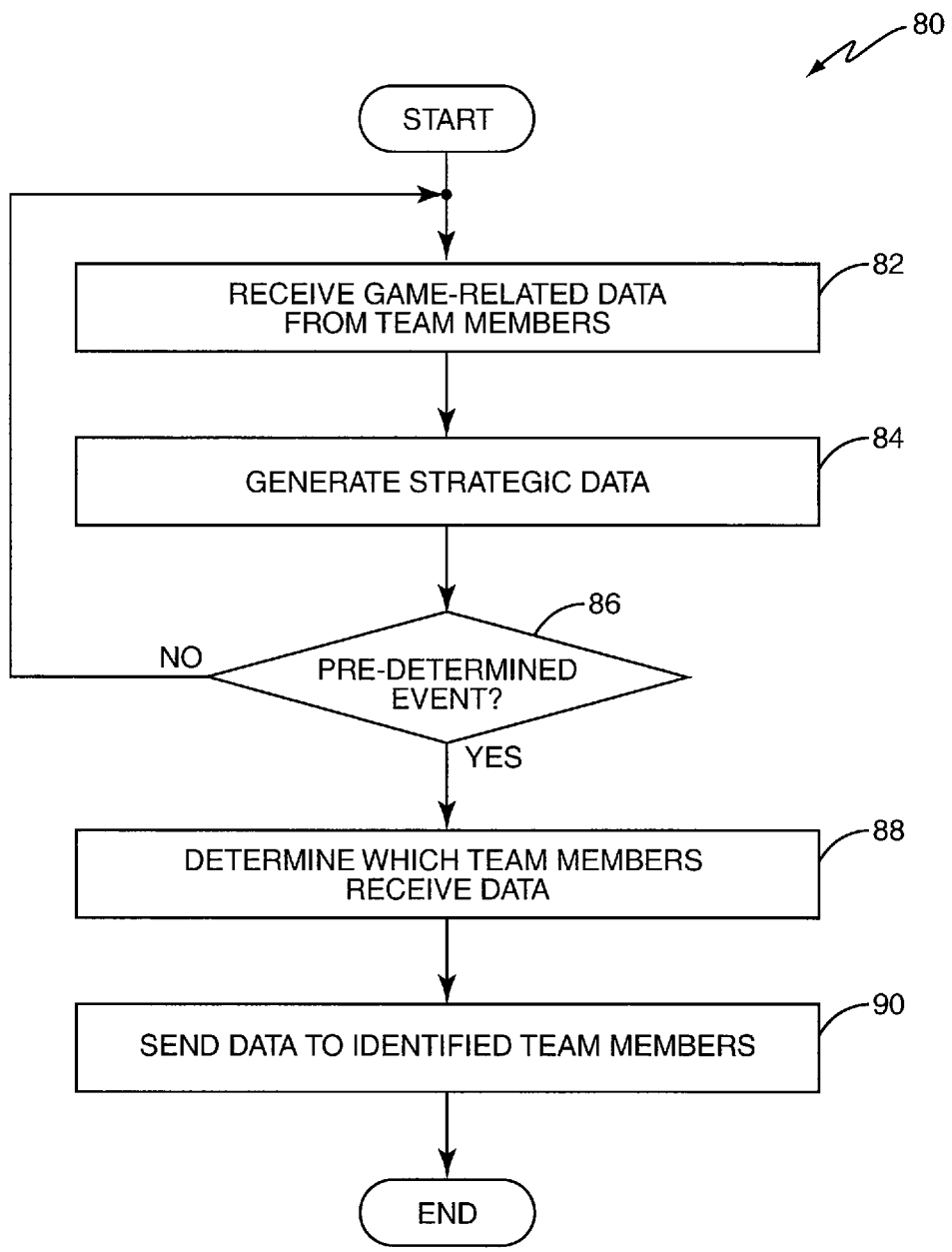
FIG. 3 is a flow chart illustrating another method of distributing game-related data according to another embodiment of the present invention.

FIG. 3 illustrates another method 80 by which a host server 50 may distribute the data to the team members. Method 80 begins with the host server 50 receiving game-related data (box 82). The data may be sent, for example, by one or more of the team members as previously described, or may be obtained from other sources. The host server 50 collects the game-related data and uses it to generate the strategic data that will be sent to the selected team members (box 84). For example, in one embodiment, the host server 50 accesses the pages of the team members and retrieves their uploaded data. The host server 50 then assembles the game-related data from each team member into one or more data objects. Whenever a predetermined event occurs (box 86), the host server 50 could determine the identities of one or more team members that are to receive the data (box 88). The host server 50 then distributes the one or more data objects to the identified team members (box 90).

The predetermined events that trigger the distribution may be any event known in the art. Further, the type and/or amount of data that is distributed may depend on the type of predetermined event detected. In one embodiment, for example, the predetermined event occurs whenever a team member logs into the host server 50 from mobile device 12 or game console 16 to play the game. If the person is a new player, the person could get most or all of the available information. This would ensure that the new player entering the game would have the team's most current set of game-related data.

In another embodiment, the predetermined event occurs when the player leaves or logs off the game. This may occur, for example, whenever a user explicitly logs off the host server 50, or whenever poor signal quality forces the mobile device 12 to "drop" an established connection to the host server 50. In these cases, the server would detect the event and distribute the player's data to the other identified players. Because the user is already on a team, however, the central server may not need to distribute as much data as if a new player were joining. Therefore, in these cases, the server may just send the player updated information thereby conserving bandwidth and other resources.

The predetermined events may also be related to a geographical location. For example, in another embodiment, the host server 50 may receive a signal from the mobile device 12 whenever it moves proximate a predetermined geographical area. The signal may identify the mobile device 12 and may include data indicating the mobile device's current location. To facilitate this aspect of the invention, the mobile device 12 could be equipped with a Global Positioning Satellite (GPS) receiver, or with circuitry for determining the user's current location. The network 20 might also determine the user's location using any of a variety of methods known in the art. The mobile device 12 could then periodically report this location to the host server 50. In other cases, the communication network might determine if the user was handed off to a new base station, and generate a signal to the host server 50 accordingly. Other examples of some predetermined events that host server 50 may detect include, but are not limited to, a player reaching a specified level of expertise, a predetermined game level, or a predefined "geographic location" within the imaginary world of the MMORPG.

Figure 4:
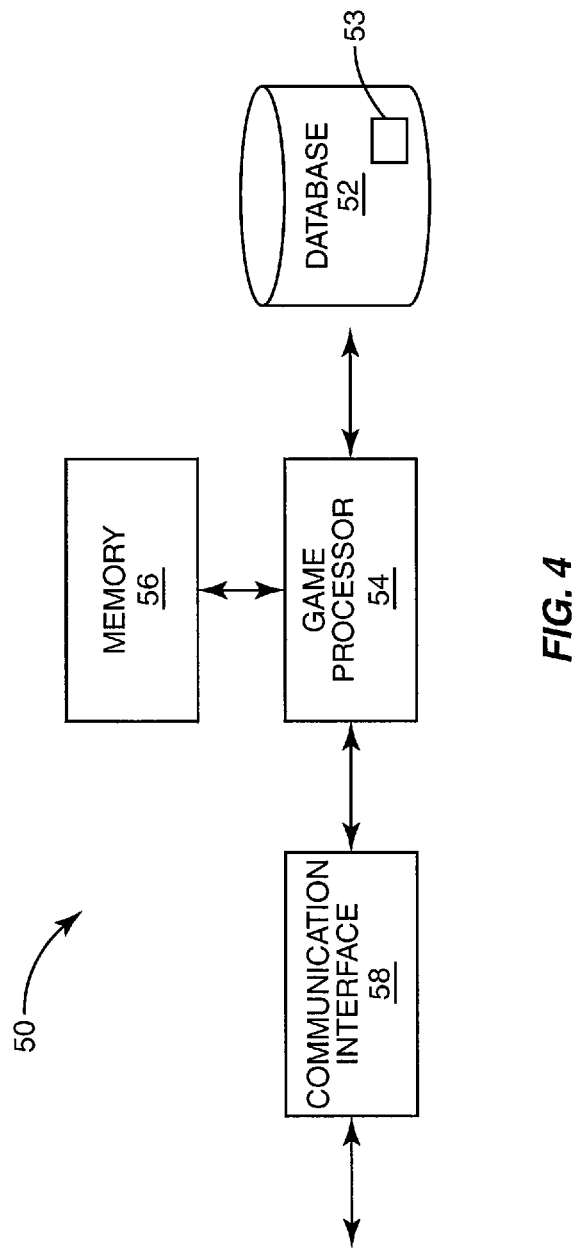
FIG. 4 is a block diagram illustrating some of the components of a host server according to one embodiment of the present invention.

FIG. 4 illustrates some of the components of a host server 50. The host server 50 comprises a game processor 54 that connects to the DB 52, memory 56, and a communication interface 58. The game processor 54 may comprise one or more microprocessors, microcontrollers, hardware circuits, and/or a combination thereof that are configured to execute the instructions and logic defining a role-playing game. Memory 56 stores data and programs needed by the game processor 54. Memory 54 may comprise one or more discrete memory devices, such as random access memory, read-only memory, and flash memory. Communications interface 58 connects the host server 50 to the packet data network 30 or mobile communication network 20. The communication interface 58 may comprise, for example, an Ethernet interface, cable modem, or DSL interface. The host server 50 monitors the communication interface 58 to determine when a predetermined event has occurred, and in response, sends the game-related data and information 53 stored in the DB 52 to one or more identified players via the communication interface 58. The mass storage device DB 52 may be any known type of mass storage device including, but not limited to, a magnetic drive or an optical disk drive.

Figure 5:
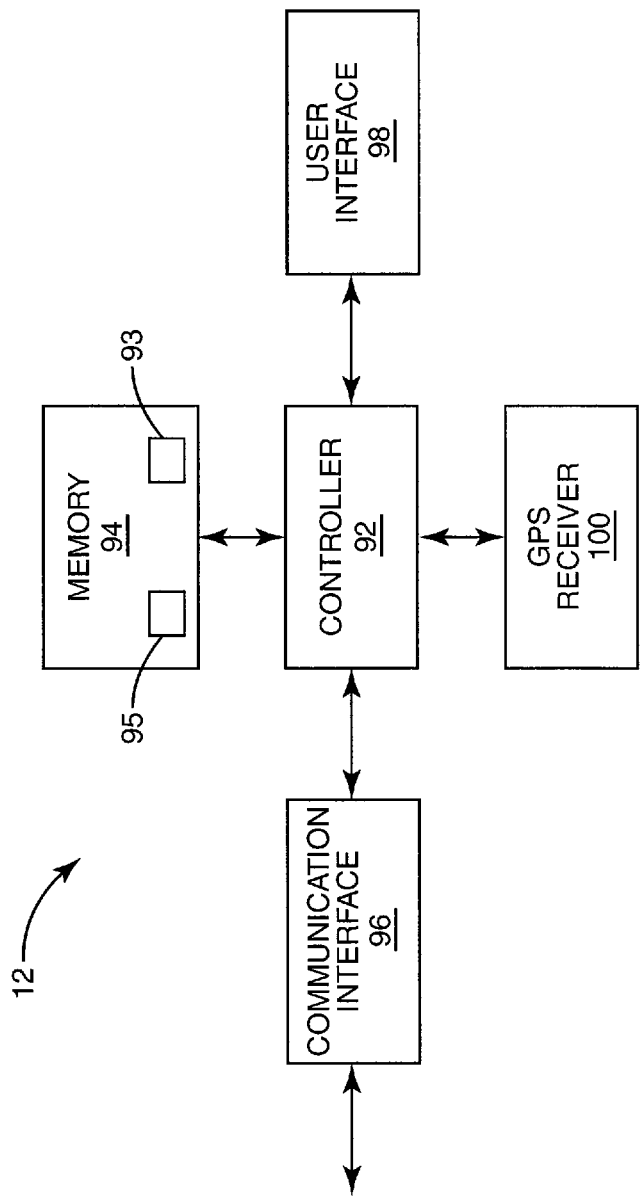
FIG. 5 is a block diagram illustrating some of the components of a mobile device configured according to one embodiment of the present invention.

FIG. 5 illustrates a mobile device 12 suitable for use with one embodiment of the present invention. As seen in Figure 5, the mobile device 12 comprises a controller 92, memory 94, a communication interface 96, and a user interface 98. The controller 92 may comprise one or more microprocessors, microcontrollers, hardware circuits, and/or a combination thereof, for allowing a user to communicate voice and text data with one or more remote parties. Memory 94, which may comprise one or more discrete memory devices such as random access memory, read-only memory, and flash memory, stores data and programs needed by the controller 92. Such data and programs include a client game application 93 and temporary user data 95. The user data 95 may be, for example, the user's game-related data 93 that is sent to host server 50 by controller 92.

Communications interface 96 connects the mobile device 12 to the communication network 10. The communication interface 96 may comprise, for example, a cellular transceiver, WiFi transceiver, an Ethernet interface, cable modem, or DSL interface. The user interface 88 includes a display for viewing game or menu information, for example, and one or more user input devices that the user may use to input data, navigate menus, and make selections. Such devices include, but are not limited to, a keypad or a joystick. The mobile device 12 may also include a GPS receiver 100 for determining the location of the mobile device 12 as is known in the art. Alternatively, the players' mobile device 12 may determine its current location using any of the well-known triangulation techniques known in the art.

Figure 6:
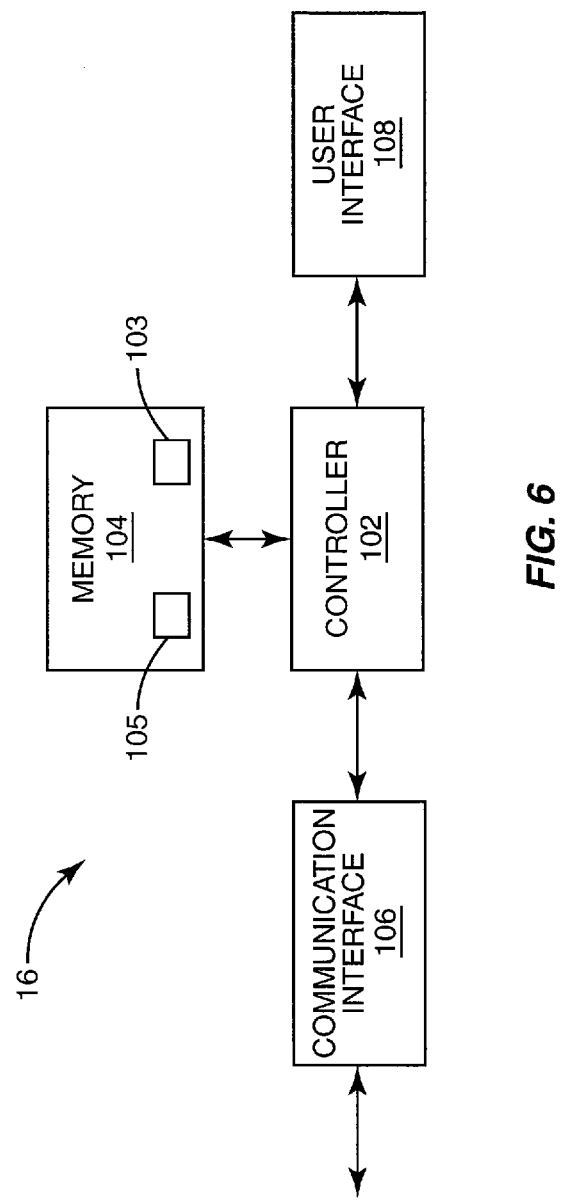
FIG. 6 is a block diagram illustrating some of the components of a game console configured according to one embodiment of the present invention

As previously stated, some gaming consoles 16 may also have user interfaces that make entering game-related data tedious. Therefore, the present invention may also be advantageously used for game consoles 16. Figure 6 illustrates an exemplary game console 16, which comprises a controller 102, memory 104, a communication interface 106, and a user interface 108.

The controller 102 may comprise one or more microprocessors, microcontrollers, hardware circuits, and/or a combination thereof, for allowing a user to play on-line games. Memory 104, which may comprise an internal hard drive or a removable cartridge, stores the game 103 and the game-related data 105 that is sent periodically to host server 50 by controller 102. Communications interface 106 connects the game console 16 to the PDN 30, and may comprise any of the interfaces mentioned above. The user interface 108 generally includes a display for viewing the game graphics, and one or more user input devices such as game controllers that allow the user to control game play.

The present invention may, of course, be carried out in other ways than those specifically set forth herein without departing from essential characteristics of the invention. For example, the previous embodiments describe the present invention as it might be used to distribute information in an on-line role playing game. However, the present invention is not limited to use in role-playing games. Distributing information and game data between players according to the present invention may be accomplished when playing any multi-player on-line game. Such games include, but are not limited to, WORLD IN CONFLICT, COUNTER STRIKE TEAM FORTRESS, and any of a variety of sports-related games or other on-line games in which the players match their skills against other players.

Further, the previous embodiments mention that the host server 50 stores and distributes the data and information to the players responsive to detecting a predetermined event. However, a client device such as computing device 14 and/or 16, may function as the game server to store the game-related data, assemble the game-related data and information when needed, and distribute the data and information to one or more other players as previously described. In such cases, there may or may not be a separate host server 50.

Therefore, the present embodiments are to be considered in all respects as illustrative and not restrictive, and all changes coming within the meaning and equivalency range of the appended claims are intended to be embraced therein.

What is claimed is:

1. A method of distributing game-related data associated with an on-line game, the method implemented on a gaming device that functions as a game server, the method comprising:
   identifying members of a team formed to play a multi-player on-line game;
   receiving game-related data from a first team member engaged in playing the game;
   generating strategic data from the received game-related data for use by the other team members in achieving a predetermined objective of the on-line game;
   detecting an occurrence of a predetermined event; and
   distributing the strategic data to one or more selected team members responsive to detecting the predetermined event while the first team member is not engaged in playing the on-line game to allow the one or more selected team members to achieve the predetermined objective.

2. The method of claim 1 wherein the received game-related data comprises quantized characteristics of an avatar controlled by the first team member.

3. The method of claim 2 further comprising periodically receiving the quantized characteristics from the first team member.

4. The method of claim 3 wherein distributing the strategic data to one or more selected team members comprises sending the strategic data to a second team member.

5. The method of claim 1 wherein detecting an occurrence of a predetermined event comprises receiving a signal indicating that the predetermined event has occurred.

6. The method of claim 5 wherein the predetermined event is associated with a current location of the first team member.

7. The method of claim 5 wherein the predetermined event is associated with a current playing status of the first team member.

8. The method of claim 1 wherein the strategic data identifies the predetermined objective for the first team member.

9. The method of claim 1 wherein the strategic data identifies tactics the first team member uses to achieve the predetermined objective.

10. The method of claim 1 further comprising generating a game object to include the strategic data, and distributing the strategic data to the one or more selected team members.

11. The method of claim 10 further comprising periodically updating the strategic data in the game object based on game-related data collected from one or more individual team members.

12. A gaming device operating in a communication network, the device comprising:

a communication interface to communicate game-related data with members of a team formed to play a multi-player on-line game; and a processor communicatively connected to the interface and configured to:

identify the members of the team;

receive game-related data from a first team member engaged in playing the game;

generate strategic data from the received game-related data for use by the other team members in achieving a predetermined objective of the on-line game;

detect an occurrence of a predetermined event; and distribute the strategic data to one or more selected team members responsive to detecting the predetermined event to allow the one or more selected team members to achieve the predetermined objective while the first team member is not engaged in playing the on-line game.

13. The device of claim 12 wherein the strategic data comprises quantized characteristics of an avatar controlled by the first team member.

14. The device of claim 13 wherein the processor is further configured to update the strategic data with updated quantized characteristics periodically received from the first team member.

15. The device of claim 12 wherein the processor is further configured to determine a type for the predetermined event.

16. The device of claim 15 wherein the processor is further configured to identify the one or more selected team members based on the type of predetermined event, and to distribute the strategic data to the one or more selected team members.

17. The device of claim 15 wherein the predetermined event comprises a signal generated to indicate that the first team member is proximate a predetermined geographical location.

18. The device of claim 15 wherein the predetermined event comprises a signal generated to indicate a current playing status of the first team member.

19. The device of claim 12 wherein the strategic data identifies the predetermined objective for the first team member.

20. The device of claim 12 wherein the strategic data identifies tactics the first team member uses to achieve the predetermined objective.

21. The device of claim 12 wherein the processor is further configured to:

generate a game object to include the strategic data; and distribute the game object to the one or more selected team members.

22. The device of claim 21 wherein the processor is further configured to update the strategic data in the game object based on game-related data collected from one or more individual team members.

23. The device of claim 12 wherein the device comprises a server in the communication network.

24. The device of claim 12 wherein the device comprises a computing device associated with one of the team members.

* * * * *